United States Patent [19]
Okumura et al.

[11] Patent Number: 5,867,388
[45] Date of Patent: Feb. 2, 1999

[54] CONTROLLER OF CONVEYANCE SYSTEM

[75] Inventors: Toshihiro Okumura, Nukata-gun; Takafumi Taki, Nagoya; Masaaki Kuroyanagi, Anjo, all of Japan

[73] Assignee: Nippondenso Co., Ltd., Kariya, Japan

[21] Appl. No.: 617,168

[22] Filed: Mar. 18, 1996

[30] Foreign Application Priority Data

Mar. 17, 1995 [JP] Japan .................................. 7-086086
Jul. 28, 1995 [JP] Japan .................................. 7-212676

[51] Int. Cl.$^6$ .............................. G06F 19/00; B65G 1/00
[52] U.S. Cl. ............................... 364/468.19; 364/468.17; 364/468.22; 364/478.02; 414/786
[58] Field of Search .................... 364/468.17–468.22, 364/228.1, 228.3–238.4, 130–132, 551.01, 552, 478.01, 478.02, 478.05, 478.07, 478.16, 478.18; 395/200.31, 427, 200.3; 414/786

[56] References Cited

U.S. PATENT DOCUMENTS

| | | | |
|---|---|---|---|
| 4,669,047 | 5/1987 | Chucta ................................ | 364/468 |
| 4,752,870 | 6/1988 | Matsumura ........................ | 364/468.17 |
| 5,056,028 | 10/1991 | Ohta et al. .............................. | 364/468 |
| 5,233,534 | 8/1993 | Osthus et al. ..................... | 364/468.06 |
| 5,373,451 | 12/1994 | Furukawa ........................ | 364/478.16 |
| 5,467,285 | 11/1995 | Flinn et al. ........................ | 364/468.19 |
| 5,568,393 | 10/1996 | Ando et al. ........................ | 364/478.02 |

FOREIGN PATENT DOCUMENTS 63-120061  5/1988  Japan .

*Primary Examiner*—James P. Trammell
*Assistant Examiner*—Bryan Bui
*Attorney, Agent, or Firm*—Cushman Darby & Cushman, IP Group of Pillsbury Madison & Sutro

[57] ABSTRACT

A controller of a conveyance system efficiently conveys parts. The controller includes an input/output interface receiving data related to the position and loading state of data of each vehicle; receiving carry-in/out requests from each job shop; and outputting carry-in/out instructions to each vehicle. The controller also includes a ROM storing a control program; a RAM storing job shop positional data, carry-in/out requests, vehicle loading state data; and a processing section computing values of a carriage instruction (e.g., origin, destination, carrier to be carried, carrying route) given to each vehicle using the carry-in/out request data from each job shop and the data stored in the RAM based on the program stored in the ROM.

11 Claims, 11 Drawing Sheets

| JOB SHOPS (NODE) | POSITION DATA | | CARRY-IN REQUEST | CARRY-OUT REQUEST |
|---|---|---|---|---|
| | X | Y | | |
| J1 (A) | $X_A$ | $Y_A$ | 1 (S→A) | 0 (——) |
| J2 (B) | $X_B$ | $Y_B$ | 1 (S→B) | 1 (B→S) |
| ⋮ | ⋮ | ⋮ | ⋮ | ⋮ |
| J7 (G) | $X_G$ | $Y_G$ | 1 (S→G) | 1 (G→S) |

FIG. 2B

| ROUTE | LENGTH |
|---|---|
| BETWEEN A AND B | $L_{AB}$ |
| BETWEEN B AND C | $L_{BC}$ |
| ⋮ | ⋮ |

FIG. 2C

| VEHICLE | POSITION DATA | | LOADING STATE |
|---|---|---|---|
| | X | Y | |
| V1 | $X_{V1}$ | $Y_{V1}$ | 0 % |
| V2 | $X_{V2}$ | $Y_{V2}$ | 75 % |
| ⋮ | ⋮ | ⋮ | ⋮ |
| V7 | $X_{V7}$ | $Y_{V7}$ | 25 % |

FIG. 4

| JOB SHOP | CARRY-IN REQUEST | | CARRY-OUT REQUEST | |
|---|---|---|---|---|
| | ROUTE | NUMBER OF CASES | ROUTE | NUMBER OF CASES |
| J2 | S→B | 1 | B→S | 1 |
| J3 | S→C | 1 | — | 0 |
| J1 | S→A | 1 | — | 0 |
| J4 | S→D | 1 | — | 0 |
| J7 | S→G | 1 | G→S | 1 |
| J6 | — | 0 | F→S | 1 |
| J5 | — | 0 | E→S | 1 |

CONTROLLER OF CONVEYANCE SYSTEM

CROSS REFERENCE TO RELATED APPLICATION

This application is based upon and claims the benefit of priority of the prior Japanese Patent Application No. 7-86086 filed on Mar. 17, 1995 and No. 7-212676 filed on Jul. 28, 1995, the contents of which are incorporated herein by reference.

BACKGROUND OF THE INVENTION

1. Field of the Invention

The present invention relates to a controller of a conveyance system in a production line. More particularly, the present invention relates to a controller required in controlling mobile vehicles applied in a production line of parts, such as a production line of semiconductor devices, for issuing an instruction to each individual vehicle to carry-in/out the parts to a plurality of destination arbitrarily specified among a candidate destinations.

2. Related Arts

Hitherto, there has been known a controller of a conveyance system applied to a production line of parts, a parcel distribution system or the like as disclosed in Japanese Patent Laid-open No. 63-120061, for example.

According to the technology disclosed in the aforementioned publication No. 63-120061, the controller is adapted to assign a request of carriage to an unmanned vehicle so that each work station will not become idle. At this time, it is designed to assign another request covering not only unmanned vehicles on standby and currently in operation but also the unmanned vehicle which has been already decided to be assigned within the same event. It then evaluates an access time of each of such unmanned vehicles and assigns the request to the unmanned vehicle which can be accessed first according to urgency of the carriage requests.

However, the technology described above has had a problem that it is inefficient because the carriage (carry-in/out) request or instruction issued in transporting parts from one work station to another work station is made and handled in a unit of a maximum loading capacity of one vehicle and the parts might be transported below the maximum loading capacity of the vehicle when the request is made in such a unit, as is often the case with the production line of semiconductor devices.

SUMMARY OF THE INVENTION

Accordingly, it is an object of the present invention to solve the aforementioned problem by providing a controller of a conveyance system which can process (transport) parts efficiently even when a request of carriage is made in a unit below a maximum loading capacity of a vehicle in a production line.

In order to achieve the object, according to the present invention, a controller of a conveyance system is connected to a production line having a plurality of independent work stations for implementing a certain processing on parts; a distribution station for temporarily holding the parts; a plurality of passes provided and set in advance between the work stations and the distribution station; and a plurality of carrier means for conveying the parts to any one of the work station and the distribution station by moving through the passes. The controller performs centralized control over the carriage of the parts by means of the carrier means and comprises (a) request storage means for storing a carry-in request of the parts either from any one of the work station or the distribution station to any one of another work station and a carry-out request of the parts either from any one of the work station to any of another work station or the distribution station in order of generation the requests; (b) request selecting means for selecting requests in order of the storage up to a maximum loading capacity of the carrier means for loading the parts from each request stored in the request storage means; (c) computing means for specifying the work station/distribution station to/from which the parts should be carried in/out based on each selected request; and (d) carriage control means for determining a carrying route of the carrier means based on the result computed by the computing means and outputting a carriage instruction to the carrier means to carry the parts in accordance to each request selected by the request selecting means every time the carrier means arrives at either one of each work station or the distribution station following the carrying route.

According to the arrangement described above, a maximum work amount assigned to the carrier means may be increased up to twice of the maximum loading capacity of the carrier means by one carriage instruction and each request is executed while processing carry-in/out requests in a time-series manner, so that a predetermined work may be performed without delay in each work station/distribution station on a decided carrying route.

BRIEF DESCRIPTION OF THE DRAWINGS

These and other objects, features and characteristics of the present invention will be appreciated from a study of the following detailed description, the appended claims, and drawings, all of which form a part of this application. In the drawings:

DETAILED DESCRIPTION OF THE PRESENTLY PREFERRED EXEMPLARY EMBODIMENTS

[First Embodiment]

Figure 1:
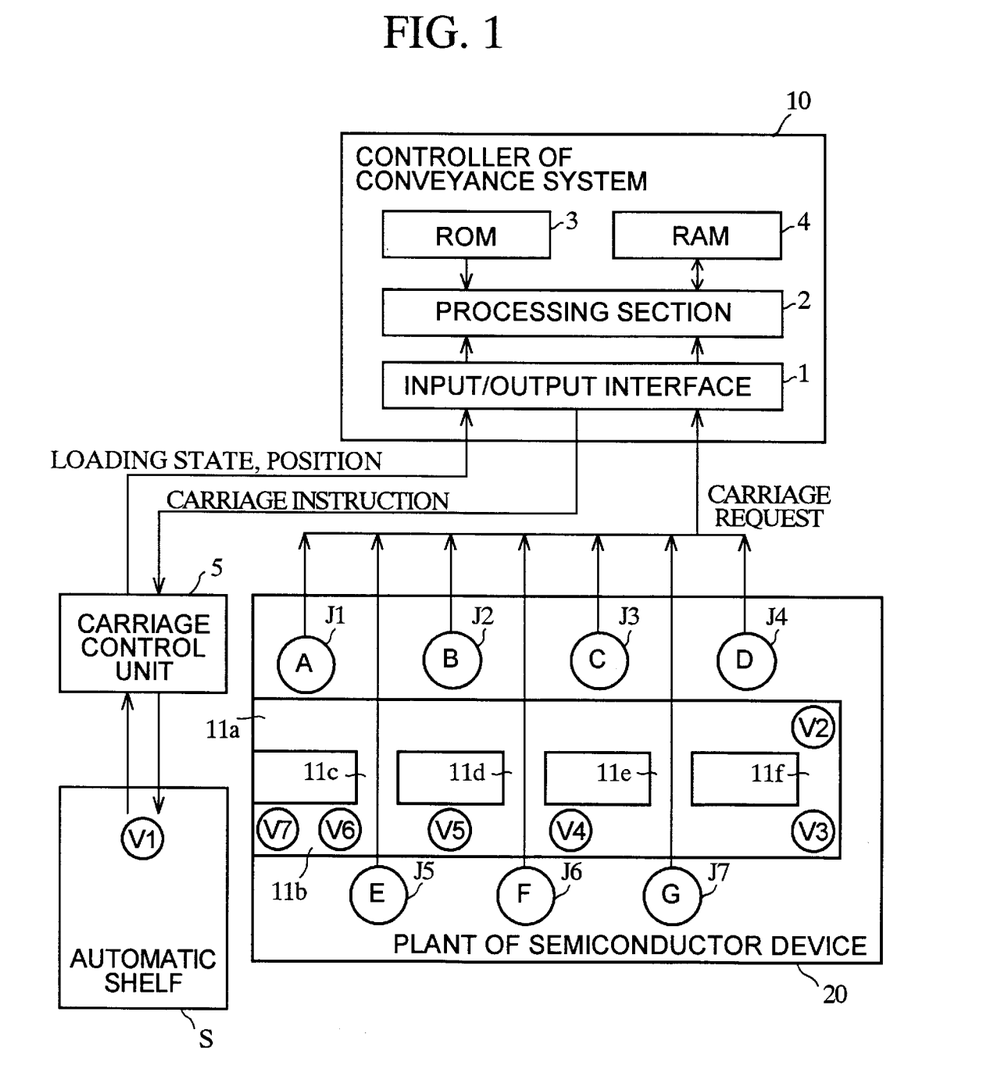
FIG. 1 is a structural diagram showing a structure of a first embodiment of the present invention.

FIG. 1 shows a structure of a first embodiment of the present invention.

A plant 20 (or a production line) of semiconductor devices such as semiconductor wafers comprises a plurality of passes 11a through 11f and a plurality of job shops (or work stations) J1 through J7 as nodes A through G.

A controller 10 of the conveyance system of the plant is composed of an input/output interface 1, a processing section 2, a ROM 3 and a rewritable RAM 4 (or request storage means).

The input/output interface 1 receives data of position and loading state of each vehicle (or carrier means) V1 through V7 and carry-in/out requests from each job shop J1 through J7 and outputs carry-in/out instructions to each of the vehicles V1 through V7. A control program is stored in the ROM 3. Data of position of each job shop J1 through J7 and of carry-in/out requests as well as data of position and loading state of each vehicle V1 through V7 are stored in the RAM 4. The processing section (or processing means) 2 computes values of the carry-in/out instruction (origin, destination, carrier to be carried, carrying route, carrying sequence, etc.) given to each vehicle V1 through V7 by using the data of the carry-in/out request from each job shop J1 through J7 and the data stored in the RAM 4 based on the program stored in the ROM 3.

The controller 10 configured as described above controls the conveyance of articles by using a modeled transporting route network and the vehicles V1 through V7 among the job shops J1 through J7.

It is noted that an automatic shelf S in FIG. 1 represents a distribution station where the vehicle (not shown) in which a product from each job shop J1 through J7 is stored is temporarily held.

The data of position and loading state of each vehicles V1 through V7 located on the automatic shelf S and the passes 11a through 11f is input to the input/output interface 1 of the controller 10 of the conveyance system via a carriage control unit 5 (or a carriage control means). The carriage instruction value from the input/output interface 1 to each vehicle V1 through 7 is also output via the carriage control unit 5.

Figure 2A:
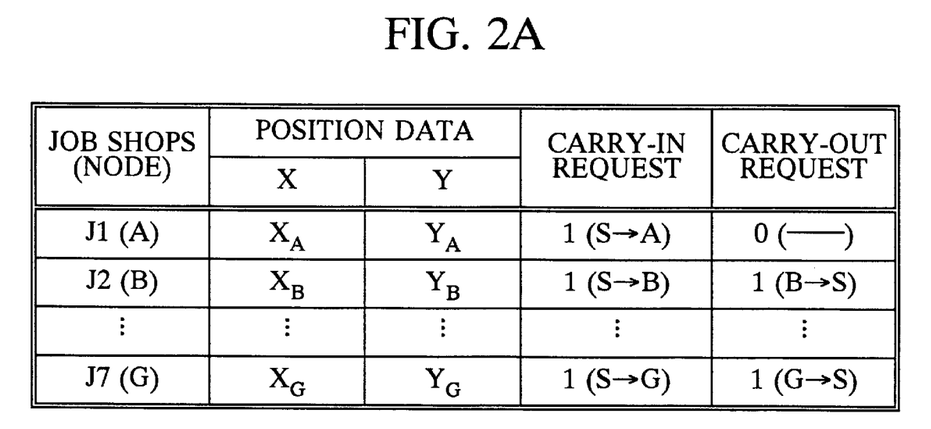
FIGS. 2A through 2C are tables showing structures, which are stored in RAM, of job shop data, route data and vehicle data, respectively.
Figure 2B:
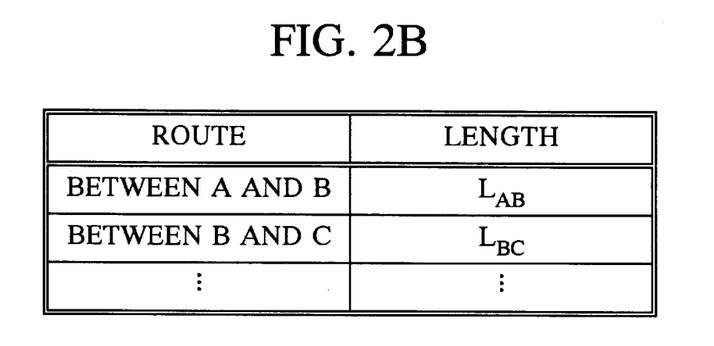
Figure 2C:
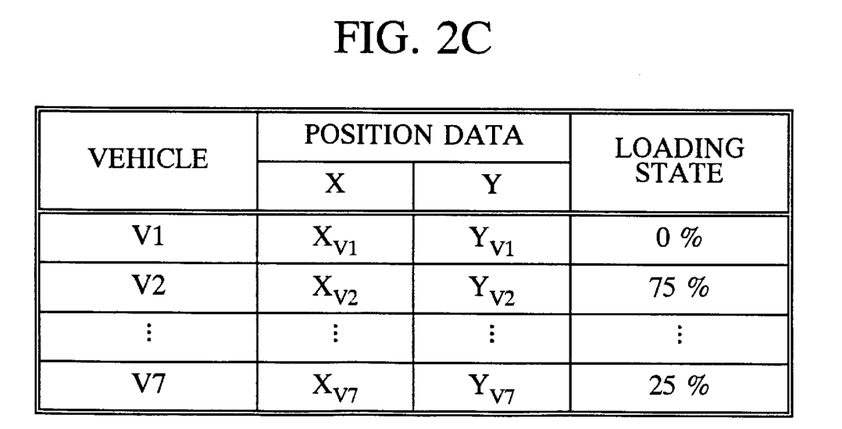

In the configuration described above, the data stored in the RAM 4 and used to calculate a carrying route has structures as shown in FIGS. 2A through 2C.

FIG. 2A shows data of the job shops J1 through J7, comprising the position of each job shop J1 through J7 (each node A through G), a number of carry-in requests and a number of carry-out requests, etc. Data within parentheses in the carry-in/out request fields in the table represent origins and destinations, respectively.

It is noted that the carry-in/out requests are stored in connection with time when respective requests are issued, though not shown in the table.

FIG. 2B shows a length of a route between each node A through G.

FIG. 2C shows the data of position and loading state (represented by percentage) of each vehicle V1 through V7.

Contents of processing carried out by the processing section 2 will be explained below with reference to a flow chart shown in FIG. 3.

At first, vehicles to be instructed are selected in Step 110. Although not shown, a signal line is provided between each vehicle V1 through 7 and the carriage control unit 5 and the data of position and loading state of each vehicle V1 through 7 is input to the processing section 2 via the carriage control unit 5 and the input/output interface 1. It is noted that the data may be transmitted or received by radio between each vehicle V1 through 7 and the carriage control unit 5.

In the present embodiment, it is considered that a carriage instruction is completed when a certain vehicle has carried out the instruction and a loading state thereof has become zero and the vehicle is selected to move to the next step. Assume here that the vehicle V1 positioned in the automatic shelf S is selected.

A non-carried carriage request (carry-in/out request) is input from the job shop J1 through J7 to create a carriage request table next in Step 120.

The carriage request table shows a route and a number of carry-in requests and a route and a number of carry-out requests per each job shop J1 through J7. When there is one carry-in request from the automatic shelf S to the job shops J1 through J4 and J7, respectively, and one carry-out request from the job shops J2, J7, J6 and J5 to the automatic shelf S, for example, the carriage request table turns out as shown in FIG. 4.

That is, while the job shops J1 through J4 and J7 each have one carry-in request, they are arranged in the order of the job shops J2, J3, J1, J4 and J7 according to time-series of the requests. Then, the carry-out requests are arranged in the respective job shops.

It is noted that the job shops having no carry-in request are arranged according to time-series of the carry-out requests. In the case of the present example, while the job shops J5 and J6 each have one carry-out request, they are arranged in order of job shops J6 and J5 according to time-series of those requests.

Figure 4:
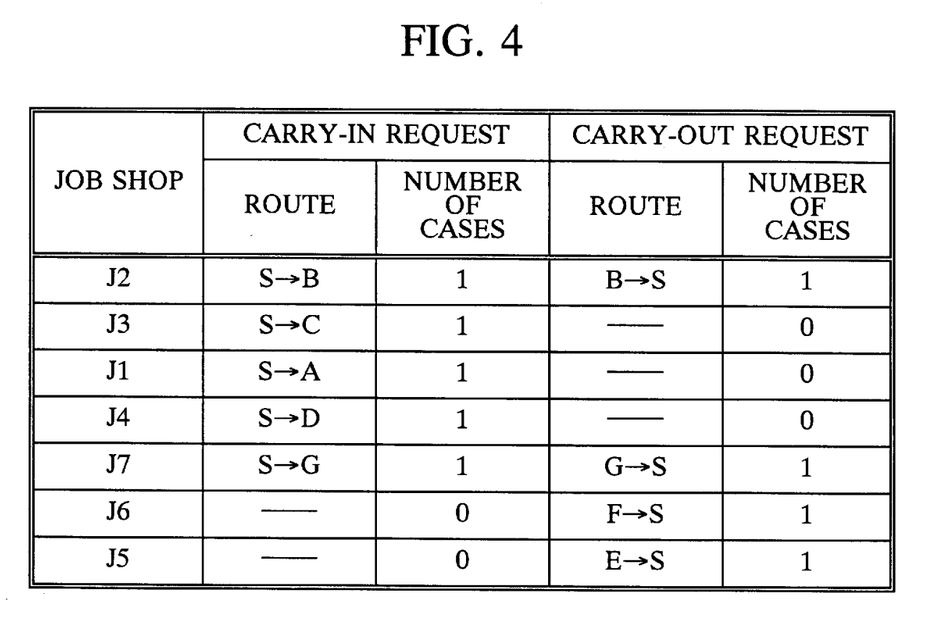
FIG. 4 is a table showing a structure of a carriage request table.

If each vehicle V1 through V7 has four carriers and one carry-in/out request takes one carrier, the data concerning the job shops J2, J3, J1 and J4 in the carriage request table shown in FIG. 4 becomes the first object of the carriage instruction.

Figure 5:
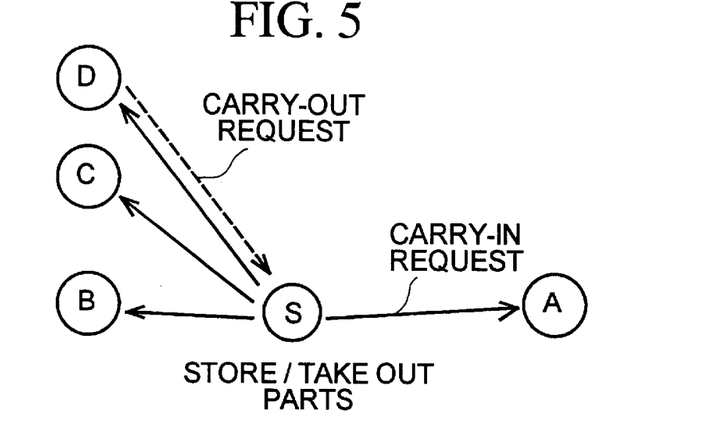
FIG. 5 is a schematic diagram modeling a semiconductor plant.

The carrying routes may be modeled as shown in FIG. 5 by indicating the carry-in requests by arrows from the automatic shelf S to the job shops J2, J3, J1 and J4 and the carry-out requests by arrows from the job shop J2 to the automatic shelf S. It can be seen from FIG. 5 that there are the carry-in requests between the automatic shelf S and the nodes A, B, C and D and there is the carry-out request between the node B and the automatic shelf S.

After that, the processing section 2 performs a comparison operation of the carriage requests in Step 130. That is, it discriminates and counts the carry-in requests and carry-out requests from the carriage request table, compares the result of the count and outputs the carriage request whose number is greater as a first request type and the other carriage requests whose number is less as a second request type.

In the case of the present example, because there are four carry-out requests and five carry-in requests from the carriage request table shown in FIG. 4, the carry-in request whose number is greater is output as the first request type and the carry-out request as the second request type.

In Step 140, the processing section 2 performs a first assigning operation by selecting one carriage request which has been requested at the earliest time among the carriage requests belonging to the first request type output in Step 130 as a first carriage request, by deleting the selected carriage request from the carriage request table and by repeating the selection and deletion of carriage requests until a number of selected carriage requests reaches the maximum loading capacity of the vehicles V1 through V7 only by the carriage requests of the first request type or the carriage requests stored in the carriage request table run out (corresponds to first assigning means).

That is, in this case, the carry-in request from the job shop J2 which is the oldest request among the carry-in requests is selected and then the carry-in request from the job shop J2 is deleted from the carriage request table.

Thereafter, the selection and deletion of the carry-in requests are repeated until an accumulation of the number of selected carry-in requests reaches four which is the maximum loading capacity of the vehicle V1 (a number of maximum loadable carriers is four in the present embodiment) in order of the carry-in requests, i.e., in the order of job shops J3, J1 and J4.

After performing the first assigning operation, the processing section 2 performs a second assigning operation in Step 150 by selecting among the carriage requests within the carriage request table belonging to the second request type a carriage request whose destination or origin coincides with the destination or origin node of the first carriage request selected in the first assigning operation as a second carriage request in one-to-one correspondence with the first carriage request and by deleting the selected second carriage request from the carriage request table (corresponds to second assigning means).

That is, it retrieves from the carriage request table a carry-out request having a destination which coincides with the origin of the carry-in request and having an origin which coincides with the destination of the carry-in request in the order of older carry-in requests (in the order of job shops J2, J3, J1 and J4) selected in Step 140. In the case of the present example, the processing section 2 selects the carry-out request from the job shop J2 to the automatic shelf S with respect to the carry-in request from the automatic shelf S to the job shop J2 and deletes it from the carriage request table. It is noted that the first and second assigning means correspond to request selecting means.

The results of the assignment made by the first assigning operation in Step 140 and the second assigning operation in Step 150 are combined to compute a carriage instruction value given to the vehicle V1 in Step 160. That is, the carry-in request from the automatic shelf S to the job shop J2 and the carry-out request from the job shop J2 to the automatic shelf S are combined into one set to calculate the carriage instruction value together with other carriage requests.

Then, the carriage instruction value is output to the carriage control unit 5 in Step 170. It is noted that data of the origin, the destination and a carrier to be carried is set in the carriage instruction value.

Based on the received carriage request, the carriage control unit 5 selects among the plurality of vehicles V1 through V7 a vehicle which is to perform the carriage. When the carry-in request and the carry-out request are to be executed in the same job shop, the carriage control unit 5 calculates a carrying route of the vehicle (vehicle V1 in the case of the present example) and a carriage execution sequence assuming that it is operated in the order of carry-in and carry-out (corresponds to carriage instructing means).

That is, the carriers requested to be carried into the job shops J2, J3, J1 and J4 are loaded at first from the automatic shelf S to the vehicle V1 at the location of the automatic shelf S. Then, the vehicle V1 travels from the location of the automatic shelf S to the location of the job shop J1 and the carrier which corresponds to the carry-in request to the job shop J1 is carried in there. Next, the vehicle V1 travels from the job shop J1 to the job shop J2 and the carrier which corresponds to the carry-in request to the job shop J2 is carried in there. Then, the carrier requested to be carried out from the job shop J2 is carried out there. Thereafter, the appropriate carriers are carried into the job shops J3 and J4, respectively, thus completing operations of one carriage instruction.

As described above, when a vehicle conveys parts following preset passes and when there are a carry-in request and a carry-out request in the same job shop, the carry-in and carry-out works are performed there consecutively, so that a number of carriers to be carried in the vehicle per unit time may be increased, thus improving the transporting efficiency.

Figure 6A:
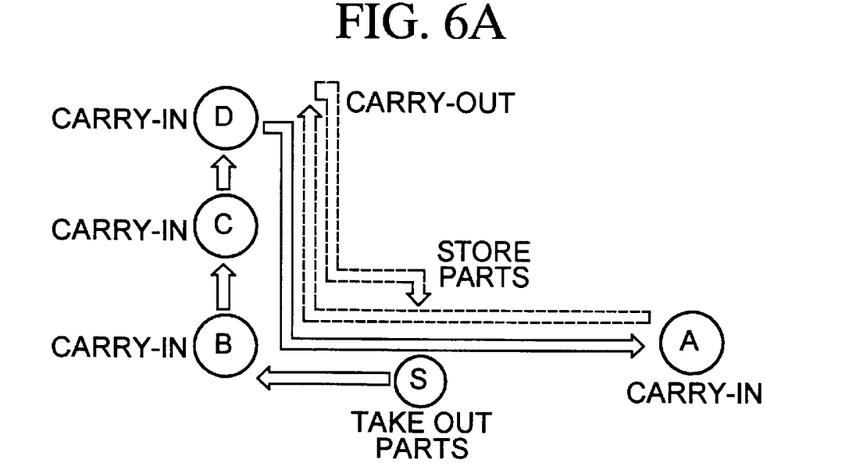
FIGS. 6A and 6B are schematic diagrams showing a comparative transport route and an embodied transport route, respectively.
Figure 6B:
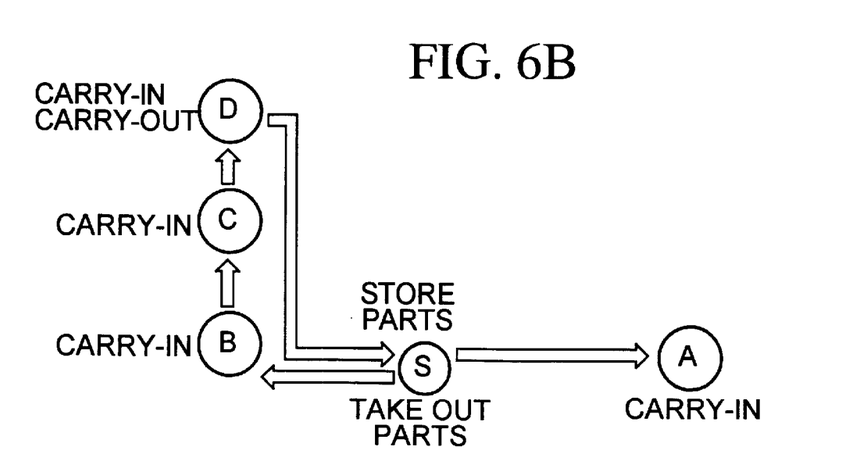

For example, when each request is arranged in a time-series manner as shown in the carriage request table shown in FIG. 4 and when four requests (job shops J1, J2, J3 and J4 (nodes A, B, C and D)) are selected in order from older one, it will be apparent from FIGS. 6A and 6B that the transporting efficiency is improved.

That is, in a transporting route shown in FIG. 6A (comparative case), the vehicle takes out parts from the automatic shelf S at first and delivers them to the job shop J2 (node B) to carry in there (arrows of solid line) in delivering the parts from the automatic shelf S to the job shops J1, J2, J3 and J4 (nodes A, B, C and D). Next, it conveys and delivers the parts from the job shop J2 (node B) to the job shop J3 (node C). Thereafter, it delivers in the order from the job shop J3 (node C) to the job shop J4 (node D) and the job shop J1 (node A) (arrows of solid line). Then, because there are a carry-in request and a carry-out request in the job shop J4 (node D), the vehicle collects and carries out parts following a transporting route shown by arrows of broken line in the figure in order to carry out the parts from the job shop J4 (node D) and stores the collected parts on the automatic shelf S (it is noted that the vehicle stands by at the location of the automatic shelf S after completing the work until it is given a next carriage instruction).

In contrast, in a transporting route of the present embodiment shown in FIG. 6B, parts to be carried out and collected from the job shop J4 (node D) are carried out consecutively with the carry-in work of the parts to be carried in. The carried out parts are then stored on the automatic shelf S on the way to the job shop J1 (node A), so that no transporting route as indicated by the arrows of broken line in the comparative case is necessary, hence improving the transporting efficiency as much.

Although the vehicle whose loading state is zero has been selected in the present embodiment, the present invention is not always confined only to such case. For example, when a vehicle whose loading state is zero is not available for a while, it is possible to use it a vehicle for carriage when carriage requests at the present moment reach a maximum loading capacity of that vehicle even if the loading state of the vehicle is not zero.

Figure 3:
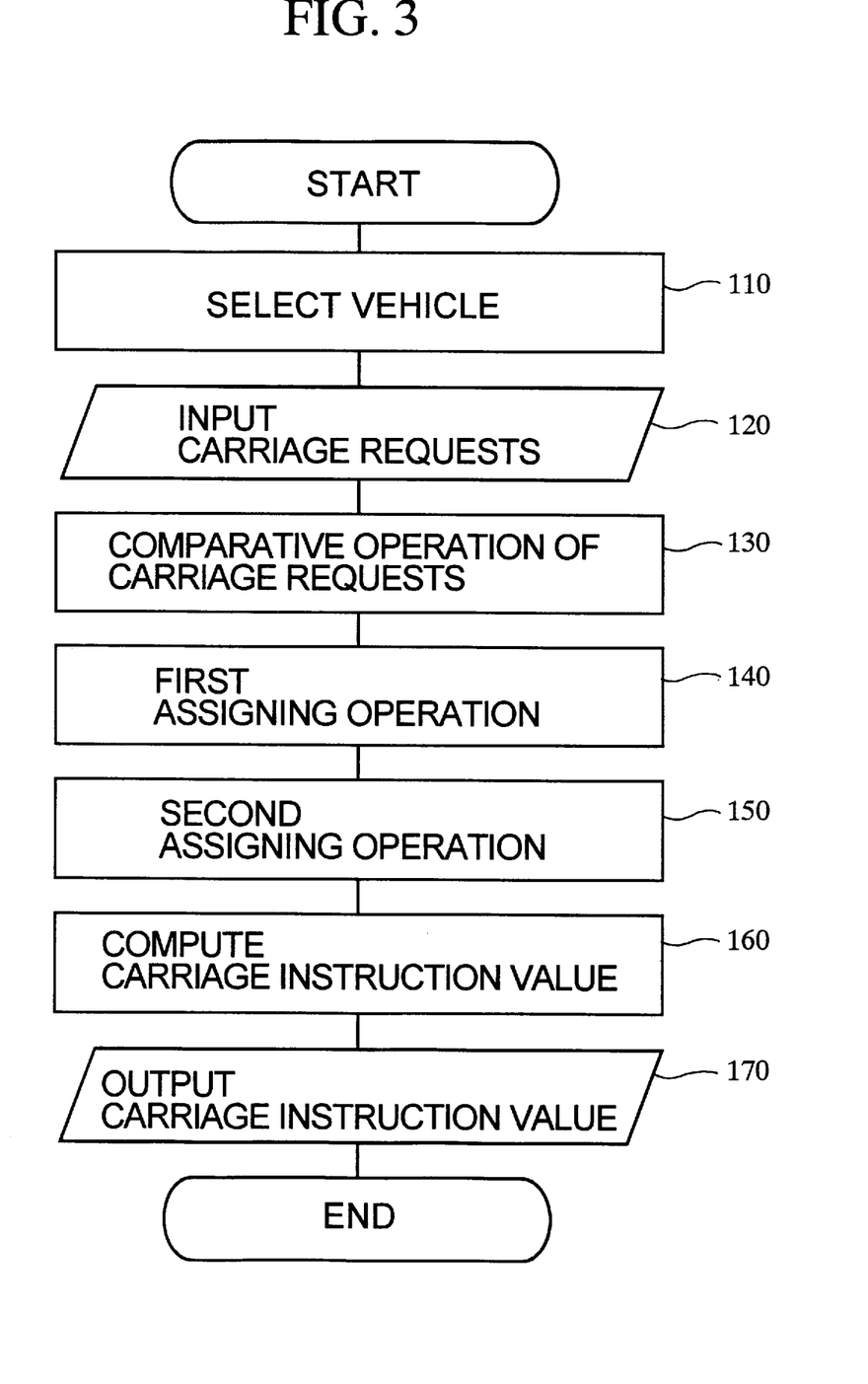
FIG. 3 is a flow chart showing contents of processing carried out in a processing section.

Further, although the vehicle has been selected and the series of processing has been performed in Step 110 when the loading state of the vehicle became zero in the flow chart shown in FIG. 3 in the present embodiment, the present invention is not confined to that. That is, it is possible to replace the selection of the vehicle in Step 110 with the input of the carriage request in Step 120 and to select the vehicle every time a carriage request is made.

[Second Embodiment]

A second embodiment is characterized in that the request selecting means selects carriage requests in order from the one which has been made earliest.

Figure 7:
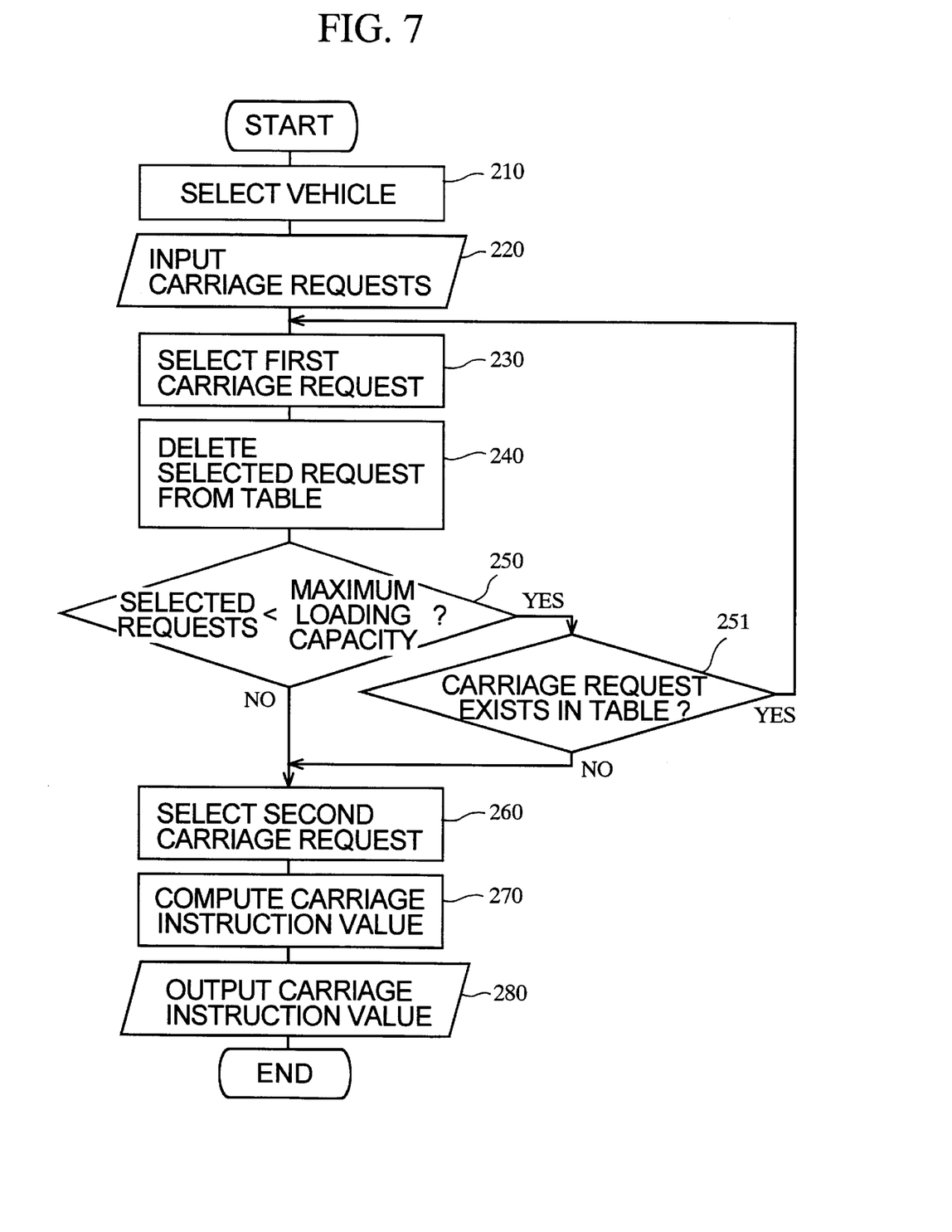
FIG. 7 is a flow chart showing contents of processing of the processing section according to a second embodiment.

The second embodiment of the present invention will be explained below with reference to FIG. 7. Because a hardware configuration of the second embodiment is identical with that of the first embodiment, the same reference numerals denote the corresponding parts thereof. FIG. 7 is a flow chart showing contents of processing of the processing section 2.

After receiving non-carried carriage requests from each job shop J1 through J7 to create a carriage request table in Step 220, the processing section 2 selects one carriage request which has been made earliest as a first carriage request in Step 230.

It deletes the selected first carriage request from the carriage request table in Step 240 and repeats the selection and deletion of carriage requests until a number of selected requests reaches the maximum loading capacity of the vehicle V1 or appropriate carriage requests run out of the carriage request table in Steps 250 and 251.

When a number of the first carriage requests reaches the maximum loading capacity of the vehicle V1 or the appropriate carriage requests run out, the processing section 2 selects from the carriage request table a carriage request whose destination or origin coincides with that of the carriage request as a second carriage request in Step 260, causes the first carriage request and the second carriage request to correspond in a relationship of one-to-one to compute a carriage instruction value given to the vehicle V1 in Step 270 and outputs it to the carriage control unit 5 in Step 280.

The carriage requests may be processed in a time-series manner in the second embodiment by the flow described above.

It is noted in relation with the present embodiment that when a request whose carry-in/out condition is different from a request selected is stored in either of the job shops J1 through J7 or the automatic shelf S related to the selected request every time when one carrier request is selected in the order from one which has been made earliest, it is also preferable to repeat the selection of the different requests as much as possible up to the maximum loading capacity of the vehicle.

[Third Embodiment]

A third embodiment is characterized in that the request selecting means counts a number of carriage requests per each node and selects carriage requests based on the node having more requests.

Figure 8:
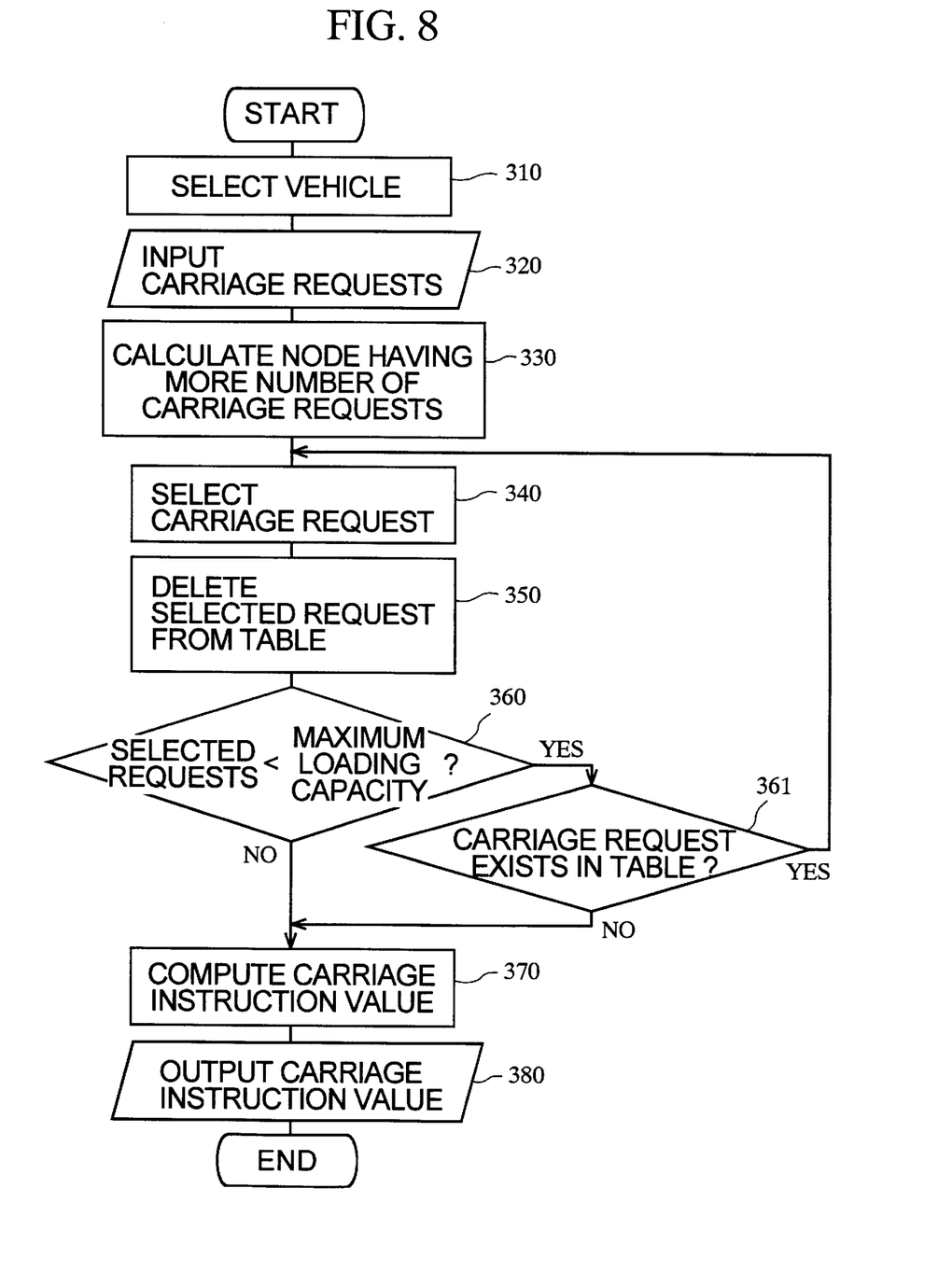
FIG. 8 is a flow chart showing contents of processing of the processing section according to a third embodiment.

The third embodiment of the present invention will be explained with reference to FIG. 8. Because a hardware configuration of the third embodiment is identical with that of the first embodiment, the same reference numerals denote the corresponding parts thereof. FIG. 8 is a flow chart showing contents of processing in the processing section 2 according to the third embodiment.

After receiving non-carried carriage requests from each job shop J1 through J7 to create a carriage request table in Step 320, the processing section 2 counts a number of carriage requests per node and finds out a node having the carriage requests most in Step 330.

It then selects one oldest carriage request among the carriage requests whose destination or origin is that node in Step 340.

It deletes the selected carriage request from the carriage request table in Step 350 and repeats the selection and deletion of the carriage request until a number of selected requests reaches the maximum loading capacity of the vehicle V1 or the appropriate carriage requests run out of the carriage request table in Steps 360 and 361.

When a number of the selected carriage requests has not reached the maximum loading capacity of the vehicle V1 and the carriage request whose destination or origin is the node found out above runs out, carriage requests whose destination or origin is a node having more requests may be selected one after another.

When a number of the selected carriage requests reaches the maximum loading capacity of the vehicle V1 or the appropriate carriage request runs out, it computes a carriage instruction value given to the vehicle V1 based on the carriage requests in Step 370 and outputs it to the carriage control unit 5 in Step 380.

The carriage requests whose destination or origin is the node having more carriage requests may be processed in the third embodiment by the flow described above.

[Fourth Embodiment]

A fourth embodiment is characterized in that the request selecting means counts a number of carry-in requests per each node and to select carriage requests based on the node having more requests.

Figure 9:
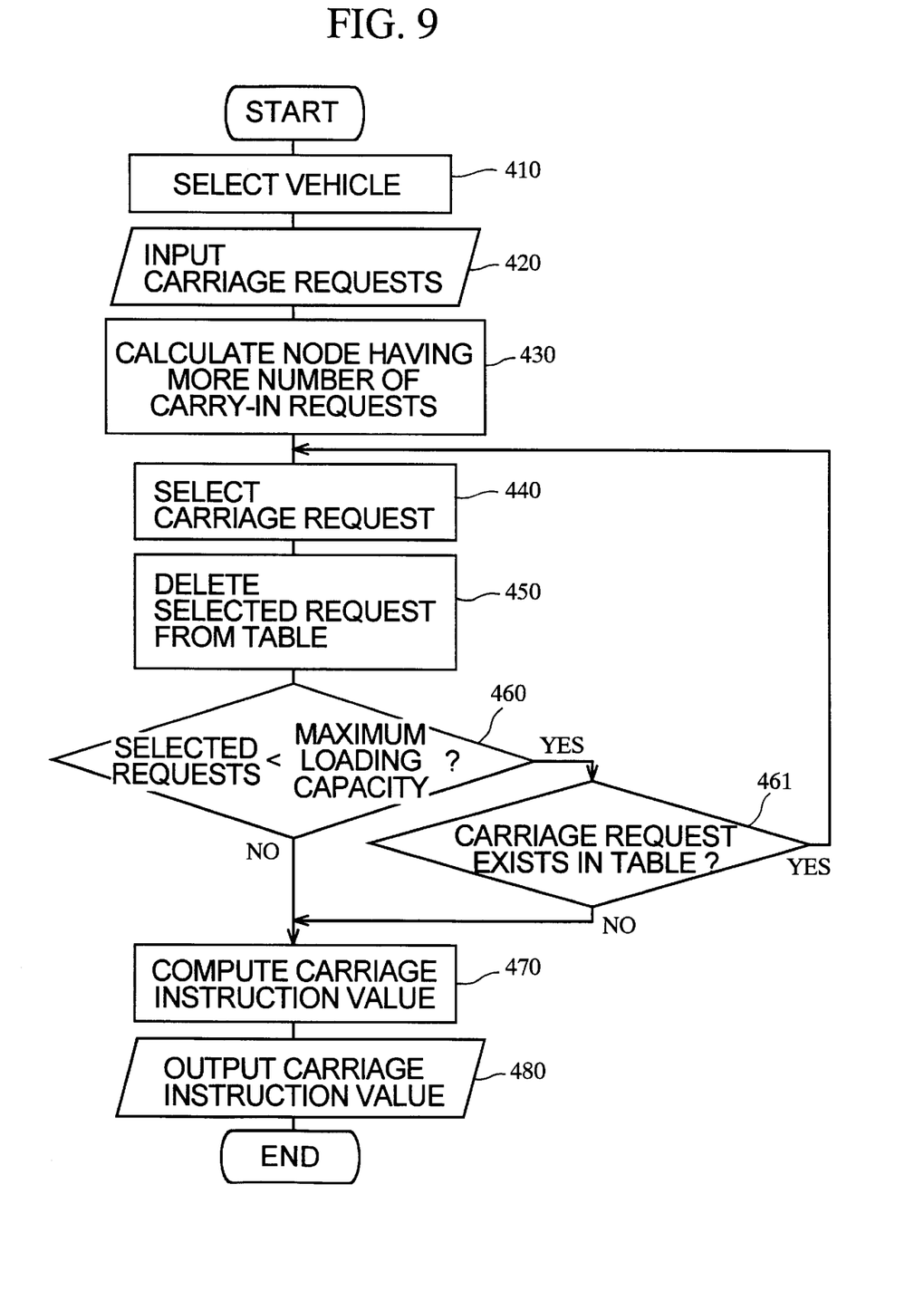
FIG. 9 is a flow chart showing contents of processing of the processing section according to a fourth embodiment.

The fourth embodiment of the present invention will be explained with reference to FIG. 9. Because a hardware configuration of the fourth embodiment is identical with that of the first embodiment, the same reference numerals denote the corresponding parts thereof. FIG. 9 is a flow chart showing contents of processing of the processing section 2 according to the fourth embodiment.

A difference of the present embodiment from the third embodiment is that the node is found out using only to the carry-in request, not the carry-out request.

The carriage requests whose destination or origin is the node having more carry-in requests may be processed in the fourth embodiment by the flow shown in FIG. 9.

[Fifth Embodiment]

A fifth embodiment is characterized in that the request selecting means counts a number of carry-out requests per each node and selects carriage requests based on the node having more requests.

Figure 10:
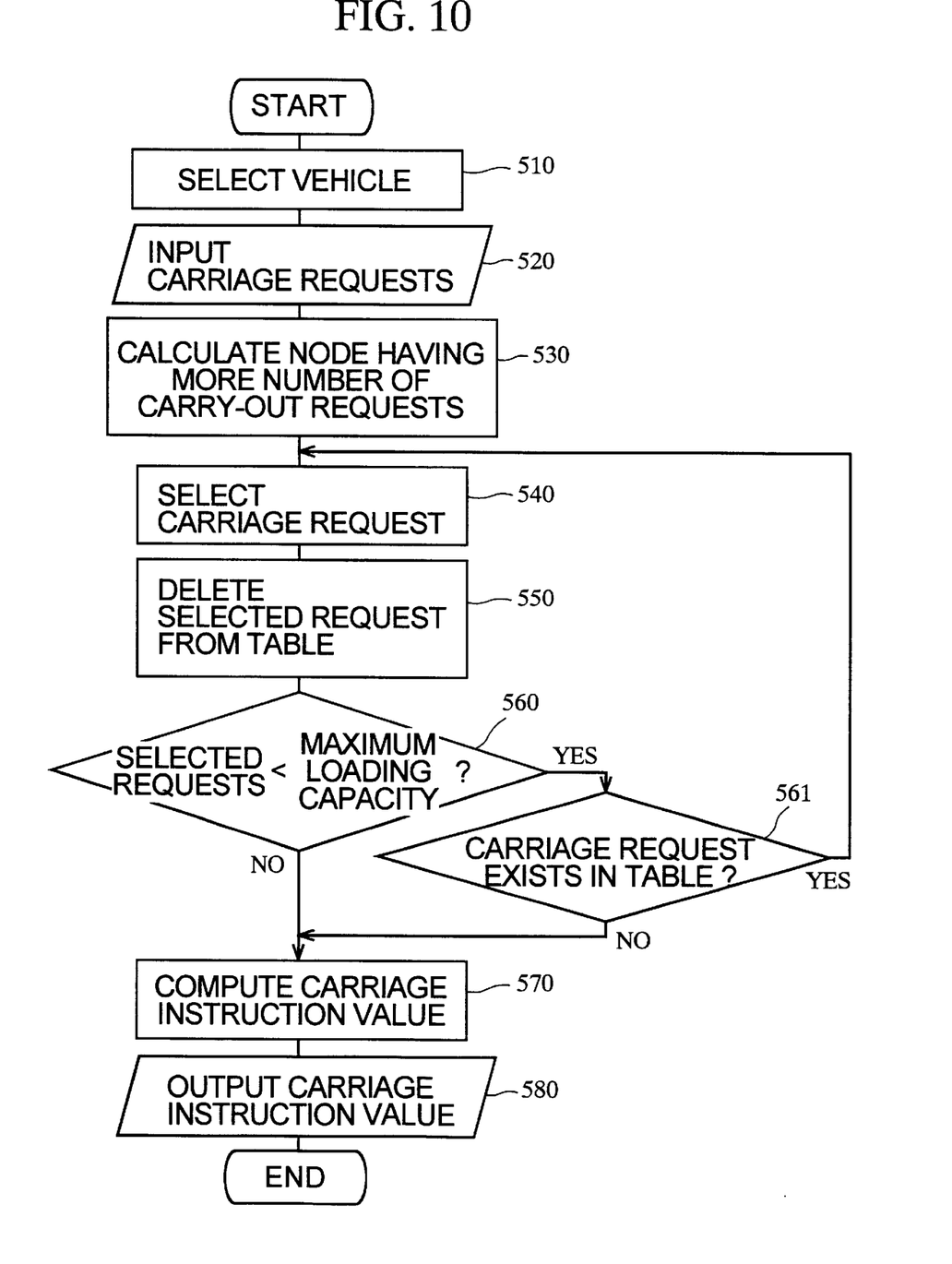
FIG. 10 is a flow chart showing contents of processing of the processing section according to a fifth embodiment.

The fifth embodiment of the present invention will be explained with reference to FIG. 10. Because a hardware configuration of the fifth embodiment is identical with that of the first embodiment, the same reference numerals denote the corresponding parts thereof. FIG. 10 is a flow chart showing contents of processing of the processing section 2 according to the fifth embodiment.

A difference of the present embodiment from the fourth embodiment is that the node is found out using only the carry-out request, not the carry-in request.

The carriage requests whose destination or origin is the node having more carry-out requests may be processed in the fifth embodiment by the flow shown in FIG. 10.

[Sixth Embodiment]

A sixth embodiment is characterized in that the request selecting means sets a priority intrinsic to an object to be carried and to select carriage requests based on the priority.

Figure 11:
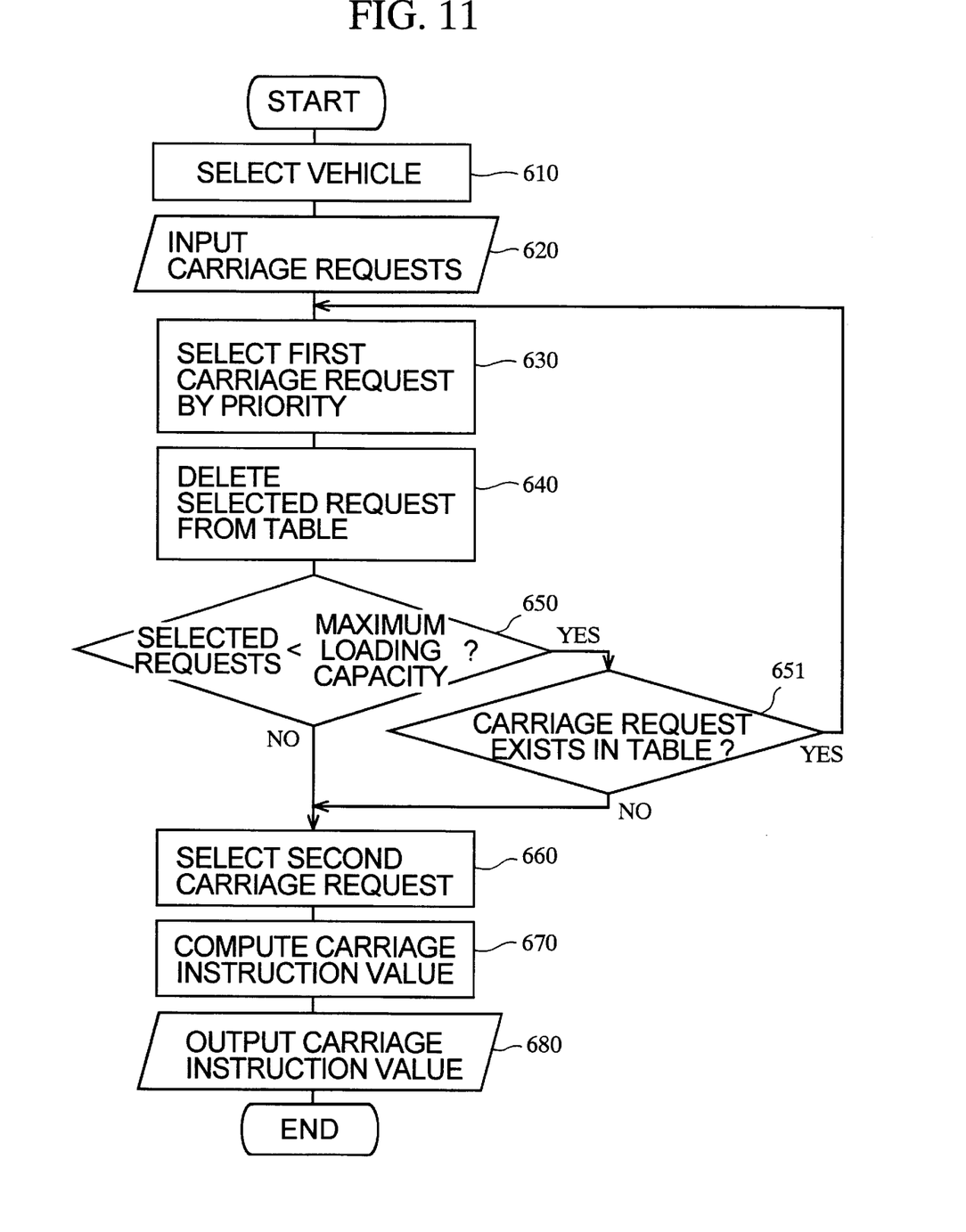
FIG. 11 is a flow chart showing contents of processing of the processing section according to a sixth embodiment.

The sixth embodiment of the present invention will be explained with reference to FIG. 11. Because a hardware configuration of the sixth embodiment is identical with that of the first embodiment, the same reference numerals denote the corresponding parts thereof. FIG. 11 is a flow chart showing contents of processing of the processing section 2 according to the sixth embodiment.

After receiving non-carried carriage requests from each job shop J1 through J7 to create a carriage request table in Step 620, the processing section 2 selects one carriage request having the highest priority set per object to be carried as a first carriage request by making reference to a carriage priority table (corresponds to carriage priority storage means, not shown) in Step 630.

It then deletes the selected first carriage request from the carriage request table in Step 640 and repeats the selection and deletion of carriage requests until a number of selected requests reaches the maximum loading capacity of the vehicle V1 or the appropriate carriage request runs out of the carriage request table in Steps 650 and 651.

When a number of the first carriage requests reaches the maximum loading capacity of the vehicle V1 or the appropriate carriage request runs out, it selects from the carriage request table a carriage request whose destination or origin coincide with that of the first carriage request as a second carriage request in Step 660, causes the first carriage request and the second carriage request to correspond in a relationship of one-to-one to compute a carriage instruction value given to the vehicle V1 in Step 670 and outputs it to the carriage control unit 5 in Step 680.

Thus, the selection of the carriage requests is made based on the intrinsic priority set for parts which are the objects to be carried according to the sixth embodiment. Accordingly, while parts must be transported to a certain job shop within a predetermined time when a leave time is limited to maintain the quality of the parts, for example, as is often the case with the production of semiconductor wafers, the parts may be transported preferably without degrading the quality of the parts by the sixth embodiment. It is noted that the first and second embodiments are also effective in transporting the parts while maintaining the quality thereof.

It is also noted that although the data of the carriage priority table may be fixed, it is also possible to arrange it so that it can be rewritten as necessary.

[Seventh Embodiment]

A seventh embodiment is characterized in that the request selecting means selects carriage requests in order from the one having the shortest carrying route.

Figure 12:
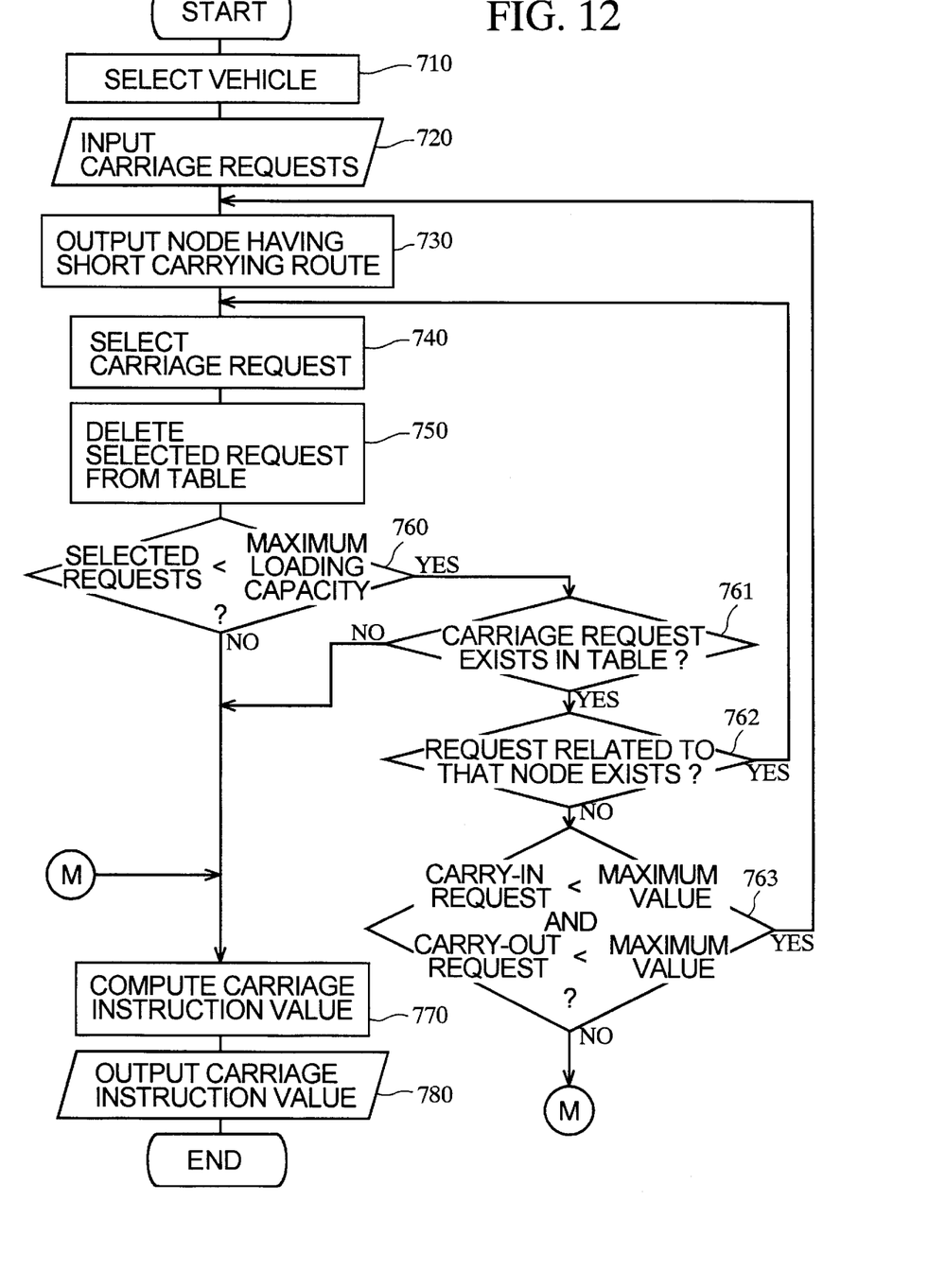
FIG. 12 is a flow chart showing contents of processing of the processing section according to a seventh embodiment.

The seventh embodiment of the present invention will be explained with reference to FIG. 12. Because a hardware configuration of the seventh embodiment is identical with that of the first embodiment, the same reference numerals denote the corresponding parts thereof. FIG. 12 is a flow chart showing contents of processing of the processing section 2 according to the seventh embodiment.

After selecting the vehicle V1 in Step 710 and receiving non-carried carriage requests from each job shop J1 through J7 to create a carriage request table in Step 720, the processing section 2 outputs a work station closest to the position of the selected vehicle V1, i.e., a node whose carrying route is shortest in Step 730.

It then selects from the carriage request table one carriage request whose destination or origin is that node in Step 740.

It deletes the selected carriage request from the carriage request table in Step 750 and repeats the selection and deletion of the carriage request until a number of the selected requests reaches the maximum loading capacity of the vehicle V1 or the carriage request related to that node runs out of the carriage request table in Steps 760 and 762.

When the carriage request related to the calculated node runs out and when the carry-in request as well as the carry-out request have not reached the maximum loading capacity yet, the result of the determination in Step 763 is YES, the next node is calculated and the same processing is performed thereafter.

When a number of the carry-in requests or that of the carry-out requests has reached the maximum loading capacity, the result of the determination in Step 763 is NO and the selection and deletion of the carriage request is finished even if there remain carriage requests stored in the carriage request table.

When a number of the selected carriage requests reaches the maximum loading capacity of the vehicle V1 or the appropriate carriage request runs out, the system computer a carriage instruction value given to the vehicle V1 based on the selected carriage request in Step 770 and outputs it to the carriage control unit 5 in Step 780.

The carriage requests may be processed in the order from one having a shorter carrying route of the vehicle V1 in the seventh embodiment by the flow described above.

Although the initial position of the vehicle V1 has been set at the position of the automatic shelf S in each embodiment described above, it has been set there merely to exemplify the case when there is a carriage request between the automatic shelf S and the job shops J1 through J7 and the initial position of the vehicle V1 is not limited there.

Further, parts (semiconductor devices) may be conveyed more efficiently in the work station having two requests of carry-in request and carry-out request by setting an area to be set in the carrier means of the parts to be carried in and the parts to be carried out as the same area in each embodiment described above.

Further, although the arrangement in which the number of automatic shelves S has been one, the number of the job shops J1 through J7 has been seven, the number of the vehicles V1 through 7 has been seven and the number of maximum loadable carriers has been four in each embodiment described above, they are not limited to those numbers.

The carriage requests have been selected in order from one which has been made earliest particularly in the first and second embodiments described above. Accordingly, because parts to be carried are conveyed always by the priority of the carriage request which has been made earliest, a predetermined work may be performed at each job shop without delay. Thereby, the present invention causes no such problem which might otherwise occur that no parts are carried in even though a job shop has made a carriage request, thus dropping production efficiency and in the worst case, stopping the production line itself.

It is assumed in each of the embodiments described above that when the carry-in request and the carry-out request are to be executed in the same job shop (work station), processing is operated in the order of the carry-in request and the carry-out request. This assumption also requires that there is a space which permits semiconductor parts (normally a carrier on which a plurality of semiconductor parts are placed) to be delivered and carried in the job shop which has made a carry-in request, or, in other words, that there are no other carrier in the space into which the semiconductor parts is carried. According to each embodiment described above, the carry-in work is performed after confirming that there is no other carrier in the space to which the semiconductor parts are carried in by defining the communication sequence between the vehicle and each job shop, so that a conflict which might otherwise occur when the semiconductor parts are carried in may be reliably avoided.

As described above, according to the present invention, the carry-in and the carry-out works may be performed consecutively in the same work station, so that a maximum work amount assigned to the vehicle in one carriage instruction may be increased up to twice of the maximum loading capacity of the vehicle.

It is noted that although the production line of semiconductor devices such as semiconductor wafers has been exemplified in the embodiments described above as a case to which the present invention is applied, the present invention is not confined only to that. It may be applied to a production line between a plurality of work stations such as a production line of liquid crystal displays or a production line in which articles are carried by using a plurality of vehicles between work stations and a distribution station.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A controller of a conveyance system connected to a production line having a plurality of independent work stations for implementing a certain processing to parts, a distribution station for temporarily holding said parts, a plurality of passes provided and set in advance between said work stations and said distribution station, and a plurality of carrier means for carrying said parts to any one of said work stations and said distribution station by moving through the passes, said controller performing centralized control over the conveyance of said parts using said carrier means, said controller comprising:

request storage means for storing a carry-in request of said parts either from any one of said work stations or said distribution station to any other of said work stations and a carry-out request of said parts either from any one of said work stations to any other of said work stations or said distribution station in order of generation of the requests;

request selecting means for selecting requests in order of storage up to a maximum loading capacity of said parts on said carrier means from requests stored in said requests storage means;

computing means for specifying a work station/distribution station to/from which said parts should be carried in/out based on each selected request; and carriage control means for determining, responsive to said computing means, a carrying route of said carrier means and outputting a carriage instruction to said carrier means so that said carrier means performs carry-in or carry-out operations in accordance with each request selected by said request selecting means every time said carrier means arrives at one of said work stations or said distribution station following the carrying route.

2. A controller according to claim 1, wherein said carriage control means is for outputting a carriage instruction always instructing said carrier means to carry in and carry out said parts sequentially at the same work station when carriage works following said carry-in request are required to be done at the same station.

3. A controller according to claim 1, wherein said request selecting means is for setting a type of request which is generated more among said carry-in requests and said carry-out requests stored in said request storage means as a first request type, is for selecting requests of the first request type as much as possible up to the maximum loading capacity of said parts of said carrier means in order of storage and also is for selecting a request of a second request type, which is different from said first request type, when it is stored in said request storage means, the request of the second request type being made by any one of said work stations or said distribution station.

4. A controller according to claim 1, wherein said request selecting means is for selecting requests in order of storage as much as possible up to the maximum loading capacity of said parts of said carrier means from requests stored in said request storage means and also is for selecting requests whose carry-in/out condition is different when requests having different carry-in/out conditions with respect to each of said selected requests are stored in said request storage means, the request of the second request type being made by any one of said work stations or said distribution station.

5. A controller according to claim 4, wherein said request selecting means is for selecting requests whose carry-in/out condition is different when the requests having the different carry-in/out condition with respect to each of said selected requests are stored in said request storage means related to each selected request every time when one request is selected in order of the storage in said request storage means as much as possible up to the maximum loading capacity of said parts of said carrier means.

6. A controller according to claim 1, wherein said request selecting means is for counting said carry-in/out requests stored in said request storage means for said work stations, is for selecting requests as much as possible up to the maximum loading capacity of said parts of said carrier means in order from a work station having the most requests, and also is for selecting requests whose carry-in/out condition is different when a request having a different carry-in/out condition with respect to each of said selected requests are stored in said request storage means, the request of the second request type being made by any one of said work stations or said distribution station.

7. A controller according to claim 1, wherein said request selecting means is for selecting requests as much as possible up to the maximum loading capacity of said parts of said carrier means based on a priority intrinsic to said parts from each request stored in said request storage means and also is for selecting requests whose carry-in/out condition with respect to each of said selected requests are stored in said request storage means, the request of the second request type being made by any one of said work stations or said distribution station.

8. A controller according to claim 1, wherein said request selecting means is for selecting requests as much as possible up to the maximum loading capacity of said parts of said carrier means in order from one having a shorter pass for conveying said parts from each request stored in said request storage means and also is for selecting requests whose carry-in/out condition is different when the request having the different carry-in/out condition with respect to each of said selected requests are stored in said request storage means, the request of the second request type being made by any one of said work stations or said distribution station.

9. A controller according to claim 1, wherein said carriage control means is for outputting a carriage instruction instructing said carrier means to carry out parts after carrying in said parts to the same work station when carriage works following said carry-in request and said carry-out request are required to be done at the same work station.

10. A controller according to claim 1, wherein said carrier means is for confirming that there is a space in said work station which has made a carry-in request to which parts can be carried in and then carrying said parts to said space.

11. A controller according to claim 1, wherein said carriage control means is for outputting a carriage instruction so that the same area is used for parts to be carried in and for parts to be carried out in said carrier means when carriage work is required to be done following said carry-in request and said carry-out request the same station.

* * * * *